United States Patent

Okada et al.

[15] 3,695,381
[45] Oct. 3, 1972

[54] DOOR-LOCKING SYSTEM FOR VEHICLES

[72] Inventors: Masashi Okada; Ichita Sogabe, both of Kariya, Japan

[73] Assignee: Nippondenso Co., Ltd., Kariya-shi, Aichi-ken, Japan

[22] Filed: June 16, 1971

[21] Appl. No.: 153,779

[30] Foreign Application Priority Data

July 24, 1970    Japan .......................45/65217

[52] U.S. Cl.....................................180/112, 70/264
[51] Int. Cl................................................B60r 21/00
[58] Field of Search..............................180/111–113; 70/264

[56] References Cited

UNITED STATES PATENTS 3,613,820   10/1971   Bozoian......................180/105
3,630,305   12/1971   Kazaoka......................180/113

*Primary Examiner*—Gerald M. Forlenza
*Assistant Examiner*—R. B. Johnson
*Attorney*—Cushman, Darby & Cushman

[57] ABSTRACT

A system for locking vehicle doors in which energization of a locking cross valve and an unlocking cross valve is extended for a predetermined period of time by utilizing the charging and discharging of a capacitor even after a manual switch is opened, so that the cross valves continue to be energized for a longer period than the time by which the energization of the cross valves and servo systems may be delayed, thereby locking or unlocking the doors in a running vehicle without fail.

1 Claim, 2 Drawing Figures

DOOR-LOCKING SYSTEM FOR VEHICLES

BACKGROUND OF THE INVENTION

1. Field of the Invention

This invention relates to a door-locking system for vehicles, especially, automobiles whereby the doors of a vehicle or automobile are automatically locked when the vehicle speed exceeds a predetermined level, and which may be locked or unlocked with a manual switch.

2. Description of the Prior Art

In conventional door-locking systems, an electromagnetic valve which can be switched in three directions (hereinafter referred to as a cross valve) is energized by closing a manual switch, whereby the negative pressure at the intake manifold of a vehicle engine actuates a locking servo system including a diaphragm and piston, so that the doors of the vehicle are mechanically locked. The servo system also includes a mechanism to maintain a locked condition of the doors once they have been locked. A cross valve for unlocking the doors which is provided separately from the cross valve for locking the doors is actuated by the operation of the above-mentioned manual switch, and the actuation of the unlocking cross valve causes the actuation of an unlocking servo system separate from the locking servo system so that the locked condition which is maintained by the locked-condition-holding mechanism is forcibly removed. The above-mentioned unlocking servo system includes a mechanism for keeping the doors unlocked.

The above-mentioned conventional door-locking systems have disadvantages in that since the energization of the cross valves and servo systems for locking and unlocking the doors is delayed, they do not operate with accuracy when the manual switch is opened only a short time after it is closed. As a result, it sometimes happens that the doors which are believed to have been locked are found unlocked or the doors which are believed to have been unlocked are found to be locked.

SUMMARY OF THE INVENTION

An object of this invention is to provide a door-locking system for vehicles comprising vehicle speed detector means for generation a digital signal proportional to the vehicle speed; D-A converter means for converting said digital signal into an analog signal; amplifier means including a Schmitt circuit whose operating state is reversed when the voltage across the terminals of an integrating capacitor in the D-A converter means reaches a predetermined level; a first relay which energizes a locking electromagnetic means on receipt of a signal generated by the reversal of the operating state of the Schmitt circuit in the amplifier means; a switching means which is manually switched between locking and unlocking sides and, when closed onto the locking side, forms a circuit for charging the integrating capacitor in the D-A converter means; a second relay which includes a relay coil and a capacitor in parallel therewith and energizes the unlocking electromagnetic means on energization of said relay coil when said switching means is closed onto the unlocking side; a locking servo system which is driven when the locking electromagnetic means is energized and which includes a holder means for holding the resulting locked state; and an unlocking servo system which is driven when an unlocking electromagnetic means is energized and which includes a holder means for holding the resulting unlocked state.

As described above, the door-locking system according to this invention comprises the vehicle speed detector portion for generating a digital signal proportional to the vehicle speed; the D-A converter means for converting the digital signal into an analog signal; the amplifier means including the Schmitt circuit whose operating state is reversed when the voltage across the terminals of the integrating capacitor in the D-A converter means reaches a predetermined level; the first relay which energizes the locking electromagnetic means on receipt of a signal generated by the reversal of the operating state of the Schmitt circuit in the amplifier means; and the locking servo system which is driven when the locking electromagnetic means is energized and includes the holder means for holding the resulting locked state. Therefore, the doors can be automatically locked by energizing the locking servo system when the vehicle speed reaches a predetermined level at which the operating state of the Schmitt circuit is reversed. So, it is possible to provide a protection during accidents in which the doors of a running vehicle are suddenly opened, thus contributing greatly to safe driving.

Further, the door-locking system according to this invention is provided with a switching means by which it is possible to switch manually between the contacts on the locking and unlocking sides and, when closed on the locking side, a circuit is formed for charging the integrating capacitor in the D-A converter means. Therefore, even if the switching means is manually operated in such a way that it is opened only a short time after being closed, the hysteretic characteristics of the Schmitt circuit which is maintained in a reversed state on reception of a discharging current of the integrating capacitor in the D-A converter are utilized carefully so that the locking electromagnetic means continues to be energized for a certain time after the switching means is opened thereby extending the time for which the locking servo system operates. As a result, the doors are locked without fail even if the electromagnetic means and the servo system for locking the doors are delayed in energization. In this case, there is no need for a separate circuit for extending the energized state of the locking electromagnetic means. Instead, as described above, the discharging characteristic of the integrating capacitor originally included in the D-A converter means is utilized for that purpose, thus simplifying the circuit construction and contributing to the economy thereof.

Moreover, the door-locking system according to this invention is provided with the second relay including a relay coil and a capacitor in parallel therewith which energizes the unlocking electromagnetic means on the energization of the relay coil when the switching means is closed on the unlocking side, and further provided with the unlocking servo system including the holding means which maintains the doors at an unlocked state after unlocked on the energization of the unlocking electromagnetic means. Therefore, only by closing the switching means onto the unlocking side, the unlocking servo system is energized to immediately unlock the doors. In addition, even if the switching means is opened immediately after being closed onto the unlocking side, the discharging current of the capacitor in parallel with the relay coil of the second relay flows in the relay coil and thereby the period for which the unlocking electromagnetic means is kept energized is extended for a certain time. Thus, the electromagnetic means and unlocking servo system continue to operate, so that the doors are locked without fail even if the unlocking electromagnetic means and servo system are delayed in energization.

DESCRIPTION OF THE PREFERRED EMBODIMENT

Figure 1:
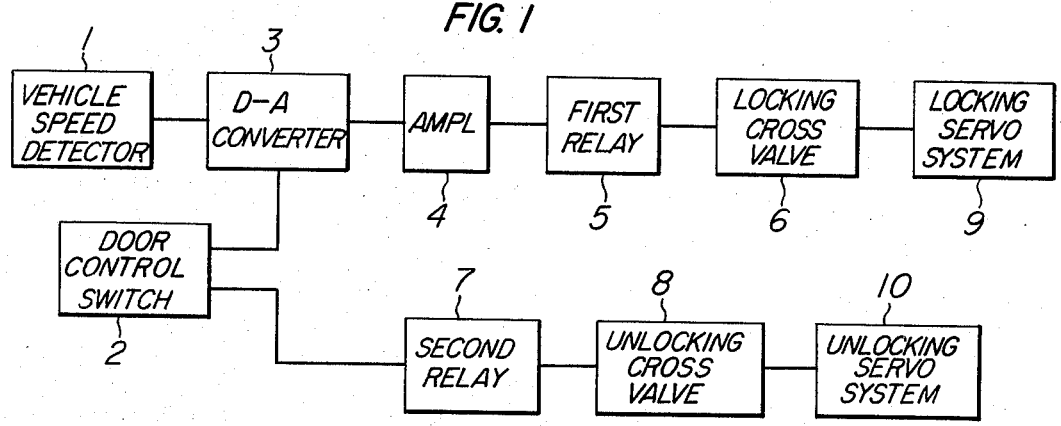
FIG. 1 is a block diagram showing the door-locking system for vehicles according to an embodiment of this invention.

The invention will now be explained with reference to the embodiment shown in the drawings. First, reference is made to the block diagram of FIG. 1 showing the general construction of the invention, in which the reference numeral 1 shows a vehicle speed detector means for generating a signal proportional to the vehicle speed by means of an electromagnetic pickup employing a reed relay. Numeral 2 shows a door control switch interlocked with handles of the doors or the like to generate the signals for locking and unlocking the doors. Numeral 3 shows a D-A converter means for converting a signal generated by the vehicle speed detector means 1 into an analog signal. This D-A converter means to which a locking signal from the door control switch 2 is applied includes a capacitor which functions such that the locking signal is substantially applied thereto for an extended period. Numeral 4 shows an amplifier portion which reverses the operation of the Schmitt circuit by means of the analog signal from the D-A converter 3 and at the same time amplifies the output signal of the Schmitt circuit. Numeral 5 shows a first relay which is energized by a signal from the amplifier portion 4. Numeral 6 shows a locking cross valve which switches between the atmospheric pressure and the negative pressure generated in the intake manifold of the vehicle engine and is adapted to supply negative pressure to the locking servo system 9 only when the electromagnetic coil of the valve is energized. The locking servo system 9 comprises pressure-driven components such as a diaphragm and piston and acts to mechanically lock the doors on application thereto of negative pressure. Besides, it is provided with a means for maintaining such a locked condition. Numeral 7 shows a second relay which functions in such a manner that it energizes the unlocking cross valve on receipt of an unlocking signal from the door control switch 2 and for a period keeps the unlocking signal present even after it is extinguished. The unlocking cross valve 8, like the locking cross valve 6, switches between the atmospheric pressure and the negative pressure in the intake manifold of the vehicle engine and is adapted to supply the negative pressure of the intake manifold to the unlocking servo system 10 only when the electromagnetic coil of the valve is energized. The unlocking servo system 10, like the locking servo system 9, includes pressure-driven components and, upon application thereto of the negative pressure, forcibly unlocks the doors which have been kept locked by the holder means of the locking servo system 9. The unlocking servo system 10 also includes an unlocked-state holder means which, once the doors are unlocked, holds them in an unlocked state until the locking servo system is energized.

Figure 2:
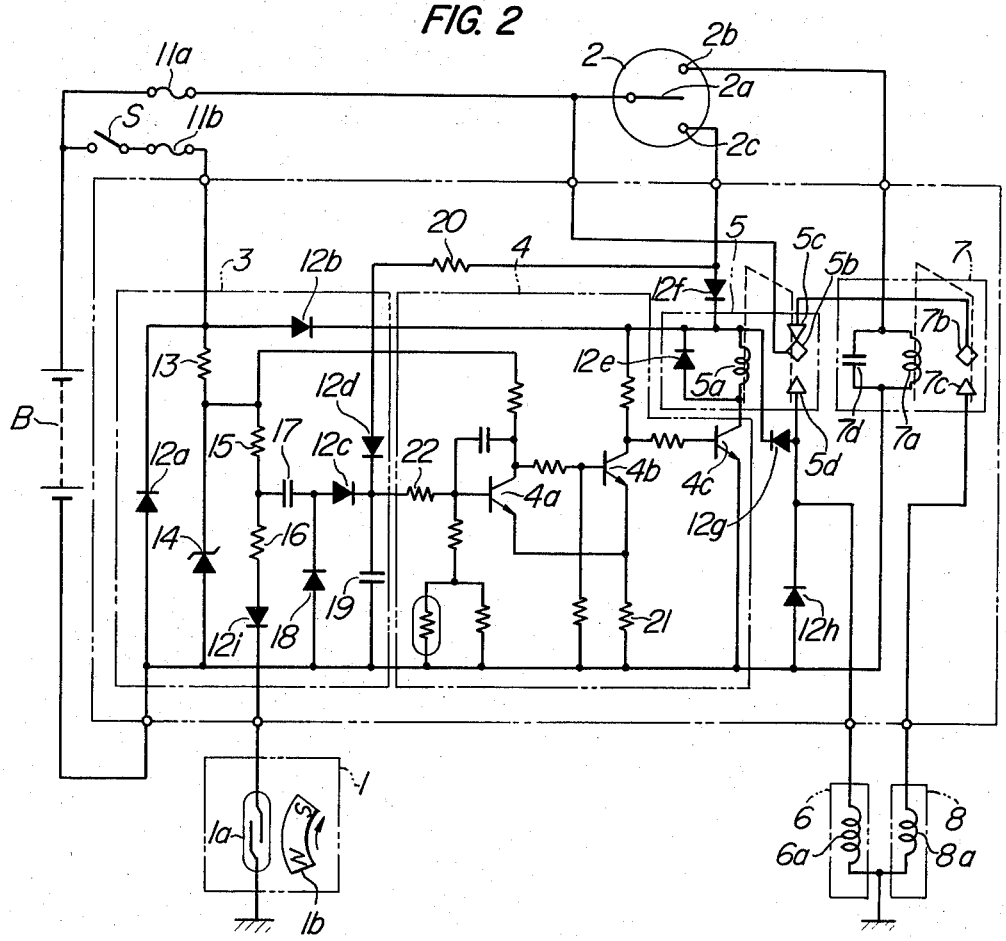
FIG. 2 shows an electrical circuit diagram of the embodiment of FIG. 1.

The detailed construction of each block in FIG. 1 will be now explained with reference to FIG. 2. The reference character B shows batteries mounted on the vehicle, character S an ignition key switch, numerals 11a and 11b fuses and numerals 12a, 12b . . ., 12i diodes provided for the purpose of preventing a reverse current and protecting the circuit. The vehicle speed detector portion 1 includes a rotor 1b having a permanent magnet and a reed relay 1a adjacent to the periphery of the rotor 1b. The rotor 1b has a plurality of magnetic poles on its rim and is adapted to be rotated by a cable in a speedometer. The rotation of the rotor 1b causes the reed relay 1a to be opened or closed, whereby rectangular pulses proportional to vehicle speed are generated across the reed relay 1a. The D-A converter portion 3 comprises a differentiator circuit having resistors 15 and 16, a clipping capacitor 17 and diode 18 so that the input signal to the vehicle speed detector portion 1 is differentiated and then converted into an analog signal proportional to the vehicle speed by means of an integrating capacitor 19. A resistor 13 and a constant voltage diode 14 constitute a constant voltage circuit. The amplifier portion 4 comprises a Schmitt circuit with a pair of transistors 4a and 4b, and at the same time includes an amplifying transistor 4c for performing a switching operation upon receipt of an analog signal from the D-A converter portion 3. The first relay 5 comprises a normally open contact 5d and a relay coil 5a which is energized or de-energized by the switching operation of the transistor 4c in the output stage of the amplifier portion 4, the normally open contact 5c and the normally closed contact 5c being connected to an electromagnetic coil 6a of the locking cross valve 6 and a movable contact 7b of the second relay 7 respectively. The movable contact 5b is connected through the fuse 11a to the batteries B.

In the above-described arrangement of the automatic locking circuit, the amplifier portion 4 performs a switching operation when the analog signal obtained from the D-A converter 3 reaches a certain level corresponding to a predetermined vehicle speed. As a result, the movable contact 5b of the relay comes to be connected with the normally-open contact 5d, whereby the electromagnetic coil 6a of the locking cross valve 6 is energized and the negative pressure is supplied to the locking servo system 9 through the cross valve 6, so that the doors are automatically locked and further kept locked by the locked-state holder means. When the vehicle speed exceeds the predetermined level, the locking servo system 9 is energized, automatically locking the doors. On the other hand, since the movable contact 5b is detached from the normally closed contact 5c, no power is supplied to the movable contact 7b of the second relay 7 and therefore the unlocking cross valve 8 (which will be described later) is not actuated to unlock the doors even if the door control switch 2 is manually operated in a running vehicle.

Manual operations of locking and unlocking the doors will be now explained. In locking the doors, the movable contact 2a of the control switch 2 is closed onto the contact 2c. Then the source voltage is supplied to the amplifier portion 4 through the diode 12f, while at the same time the integrating capacitor 19 in the D-A converter circuit 3 is charged through the resistor 20 and the diode 12d. As a result, the potential of the capacitor 19 increases irrespective of the vehicle speed detector portion 1, and when it reaches a predetermined value, the operation of the Schmitt circuit of the amplifier portion 4 is reversed and the transistor 4c in the output stage thereof and the relay coil 5a of the relay 5 are energized, thereby connecting the movable contact 5b to the normally open contact 5d and actuating the locking cross valve 6 and the locking servo system 9 to lock the doors. After that, the capacitor 19 is discharged through the resistor 22, the base and emitter of the transistor 4a and resistor 21, even if the contacts 2a and 2b of the door control switch 2 are detached. Due to the hysteretic characteristics of the Schmitt circuit, the voltage $V_{BE}$ (SAT) is higher when the transistor 4a is cut off than when it conducts. The transistor 4a is kept conducting until the potential of the capacitor 19 falls below the voltage $V_{BE}$ (SAT) of the transistor 4a to the point where the Schmitt circuit is reversed again in operation. As long as the transistor 4a is kept energized, the locking cross valve 6 continues operating. So, the doors are locked without fail by means of the locking servo system 9 and kept locked by the locked-state holder means included therein, even if the contacts 2a and 2c of the door control switch are opened as soon as they are closed or if the energization of the locking cross valve 6 and the locking servo system 9 is delayed. It is needles to say that the extended period of energization of the locking cross valve 6 is set longer than the time by which the energization of the locking cross valve 6 and the locking servo system 9 is delayed, and the extended period of energization, which is determined taking into consideration the hysteretic characteristics of the Schmitt circuit of the amplifier portion 4, can be set appropriately by selecting the time constant of the capacitor 19 and the voltage $V_{BE}$ (SAT) of the transistor 4a.

Power supply to the amplifier portion 4 through the diode 12f which is stopped by disconnecting the contacts 2a and 2c of the door control switch 2 is resumed through the movable contact 5b, normally open contact 5d and diode 12g when the first relay 5 is energized. In unlocking the doors by manual operation, the movable contact 2a is connected with the contact 2b of the door control switch 2. Then the relay coil 7a of the second relay 7 is energized and thereby the contacts 7b and 7c come to be connected, with the result that the electromagnetic coil 8a of the unlocking cross valve 8 is energized to actuate the unlocking cross valve 8, whereby the negative pressure in the intake manifold is supplied to the unlocking servo system 10 which forcibly breaks the door-locked state maintained by the holder means of the locking servo system. The capacitor 7d is charged at the same time that the relay coil 7a of the second relay 7 is energized. After that, when the contacts 2a and 2b of the door control switch 2 are opened, the capacitor 7d is discharged through the relay coil 7a. As a result, the contact 7b and 7c are kept connected thereby to continue energizing the electromagnetic coil 8a of the unlocking cross valve 8. In this way, the doors are unlocked without fail by means of the unlocking servo system 10 and at the same time kept in an unlocked state by means of the unlocked state holder means, even if the contacts 2a and 2b of the door control switch 2 are disconnected immediately after being connected or if the energization of the unlocking cross valve 8 and the unlocking servo system 10 is delayed. It is needless to say that, in this case, too, the extended period of energization of the unlocking cross valve 8 is set longer than the time by which the energization of the unlocking cross valve 8 and the unlocking servo system 10 is delayed. Such an extended period can be appropriately set by selecting the values of the capacitor 7d and the resistance of the relay coil 7a.

This invention is not limited to the above-mentioned embodiment but can be realized in various embodiments. For example, the vehicle speed detector portion 1 may comprise a photoelectric pickup including a light source and a semiconductor light-sensitive element such as a phototransistor. Also, the locking and unlocking servo systems may employ a negative pressure or a working fluid of compressed air from a pump.

We claim:

1. A door-locking system for vehicles comprising vehicle speed detector means for generating a digital signal proportional to the vehicle speed; D-A converter means for converting said digital signal into an analog signal; amplifier means including a Schmitt circuit whose operating state is reversed when the voltage across the terminals of an integrating capacitor in said D-A converter means reaches a predetermined level; a first relay which energizes a locking electromagnetic means on receipt of a signal generated by the reversal of the operating state of the Schmitt circuit in the amplifier means; switching means which is manually switched between locking and unlocking sides and, when closed onto the locking side, forms a circuit for charging the integrating capacitor in the D-A converter means; a second relay which includes a relay coil and a capacitor in parallel therewith and energizes the unlocking electromagnetic means on energization of said relay coil when said switching means is closed onto the unlocking side; a locking servo system which is driven to lock the doors when the locking electromagnetic means is energized and which includes a holder means for holding the resulting locked state; and an unlocking servo system which is driven to unlock the doors when the unlocking electromagnetic means is energized and which includes a holder means for holding the resulting unlocked state.

* * * * *